(12) United States Patent
Liu et al.

(10) Patent No.: US 11,153,212 B2
(45) Date of Patent: Oct. 19, 2021

(54) TRANSMISSION FREQUENCY MANAGEMENT FOR EDGE DEVICES OF AN INTERCONNECTED DISTRIBUTED NETWORK

(71) Applicant: International Business Machines Corporation, Armonk, NY (US)

(72) Inventors: Mingming Liu, Dublin (IE); Bora Caglayan, Dublin (IE); Cristian-Alexandru Olariu, Dublin (IE); Gavin Shorten, Allenwood (IE)

(73) Assignee: International Business Machines Corporation, Armonk, NY (US)

( * ) Notice: Subject to any disclaimer, the term of this patent is extended or adjusted under 35 U.S.C. 154(b) by 180 days.

(21) Appl. No.: 16/689,131

(22) Filed: Nov. 20, 2019

(65) Prior Publication Data
US 2021/0152476 A1 May 20, 2021

(51) Int. Cl.
*H04L 12/803* (2013.01)
*H04L 12/801* (2013.01)
(Continued)

(52) U.S. Cl.
CPC .......... *H04L 47/125* (2013.01); *H04L 47/127* (2013.01); *H04L 47/20* (2013.01);
(Continued)

(58) Field of Classification Search
None
See application file for complete search history.

(56) References Cited

U.S. PATENT DOCUMENTS

| 2003/0007485 A1* | 1/2003 | Venkitaraman | ......... H04L 47/29 370/389 |
| 2003/0009560 A1* | 1/2003 | Venkitaraman | ......... H04L 47/32 709/226 |

(Continued)

FOREIGN PATENT DOCUMENTS

| CN | 101868030 B | 4/2013 |
| CN | 103249158 A | 8/2013 |

(Continued)

OTHER PUBLICATIONS

Bienko et al., "IBM Cloudant Database as a Service Advanced Topics", Redbooks, First Edition (Apr. 2015), This document was created or updated on Apr. 17, 2015, © Copyright International Business Machines Corporation 2015, 64 pages.

(Continued)

*Primary Examiner* — Bob A Phunkulh
(74) *Attorney, Agent, or Firm* — Randy E. Tejeda

(57) ABSTRACT

In an approach to managing transmission frequency for a plurality of edge devices of an interconnected distributed network, one or more computer processors determine a maximum writing frequency, MWF, for the interconnected distributed network; iteratively process values of data flow writing frequency, DFWF, for a plurality of edge devices of an interconnected distributed network in accordance with an optimization algorithm based on the MWF to identify a convergence in the values of DFWF, wherein each iteration of processing values comprises, at each edge device in the plurality of edge devices, determine a value of DFWF based on an associated utility function of the respective edge device, wherein the utility function is a measure of utility of the device as a function of DFWF; responsive to identifying convergence, determine the converged values of DFWF to be optimal values of DFWF for the plurality of edge devices.

16 Claims, 6 Drawing Sheets

(51) Int. Cl.
*H04L 29/08* (2006.01)
*H04L 12/813* (2013.01)
*H04W 92/04* (2009.01)
*H04W 92/16* (2009.01)

(52) U.S. Cl.
CPC ............ *H04L 67/325* (2013.01); *H04L 67/34* (2013.01); *H04W 92/04* (2013.01); *H04W 92/16* (2013.01)

(56) References Cited

U.S. PATENT DOCUMENTS

| | | | |
|---|---|---|---|
| 2005/0192783 A1* | 9/2005 | Lystad | G06Q 10/06312 703/3 |
| 2013/0212214 A1 | 8/2013 | Lawson | |
| 2016/0006670 A1 | 1/2016 | Boban | |
| 2018/0324071 A1 | 11/2018 | D'Ercoli | |
| 2018/0375720 A1 | 12/2018 | Yang | |
| 2019/0034235 A1 | 1/2019 | Yang | |
| 2019/0052676 A1 | 2/2019 | Giokas | |
| 2019/0075080 A1* | 3/2019 | Entezari | H04L 63/0281 |
| 2019/0096209 A1 | 3/2019 | Chen | |
| 2019/0356548 A1* | 11/2019 | Fischer | H04L 41/0823 |

FOREIGN PATENT DOCUMENTS

| | | |
|---|---|---|
| CN | 109413698 A | 3/2019 |
| CN | 109831788 B | 12/2020 |

OTHER PUBLICATIONS

Boyd et al., "Distributed Optimization and Statistical Learning via the Alternating Direction Method of Multipliers", Foundations and Trends in Machine Learning, vol. 3, No. 1 (2010) 1-122, © 2011 S. Boyd, N. Parikh, E. Chu, B. Peleato and J. Eckstein, DOI: 10.1561/2200000016,125 pages.

Hunkeler et al., "MQTT-S A Publish/Subscribe Protocol For Wireless Sensor Networks", Printed Nov. 7, 2019, 8 pages.

Ouaddah et al.,"Towards a Novel Privacy-Preserving Access Control Model Based on Blockchain Technology in IoT", © Springer International Publishing AG 2017, DOI 10.1007/978-3-319-46568-5_53, 11 Pages.

Srikant, Rayadurgam, "The Mathematics of Internet Congestion Control", © 2004, Springer Science+Business Media New York, 2 Pages.

Traub et al., "Optimized On Demand Data Streaming from Sensor Nodes", © 2017, ACM ISBN 978-1-4503-5028-0/17/09, 12 Pages, <https://doi.org/10.1145/312479.3131621>.

* cited by examiner

TRANSMISSION FREQUENCY MANAGEMENT FOR EDGE DEVICES OF AN INTERCONNECTED DISTRIBUTED NETWORK

BACKGROUND

The present invention relates generally to the field of distributed networks, and more particularly to a method for managing transmission frequency for a plurality of edge devices of an interconnected distributed network.

An edge device is a device which provides an entry point into enterprise or service provider core networks. Examples include routers, routing switches, integrated access devices (IADs), multiplexers, and a variety of metropolitan area network (MAN) and wide area network (WAN) access devices. Edge devices also provide connections into carrier and service provider networks. An edge device that connects a local area network to a high speed switch or backbone may be called an edge concentrator. In general, edge devices are normally routers that provide authenticated access (most commonly PPPoA and PPPoE) to faster, more efficient backbone and core networks. Consequently, core networks are often designed with switches that use routing protocols such as Open Shortest Path First (OSPF) or Multiprotocol Label Switching (MPLS) for reliability and scalability, allowing edge routers to have redundant links to the core network. Links between core networks are different, for example Border Gateway Protocol (BGP) routers often used for peering exchanges.

In a typical interconnected distributed network, data from various sensors and edge devices is collected, transmitted through gateways and the cloud, and stored in a database for analysis. However, the data flow writing frequency, DFWF, that all devices of the interconnected distributed network can practically write into the database is typically limited by a maximum writing frequency, MWF. For instance, an edge device may be configured to allow ten (10) writes/sec for a basic/standard user, and fifty (50) writes/sec for an advanced/power user in some commercial applications. Accordingly, the performance of devices of an interconnected distributed network may be restricted by a writing speed constraint if the MWF is not managed properly.

SUMMARY

Embodiments of the present invention disclose a computer-implemented method, a computer program product, and a system for managing transmission frequency for a plurality of edge devices of an interconnected distributed network. The computer-implemented method includes one or more computer processers determining a maximum writing frequency, MWF, for the interconnected distributed network. The one or more computer processors iteratively process values of data flow writing frequency, DFWF, for a plurality of edge devices of an interconnected distributed network in accordance with an optimization algorithm based on the MWF to identify a convergence in the values of DFWF, wherein each iteration of processing values comprises, at each edge device in the plurality of edge devices, determine a value of DFWF based on an associated utility function of the respective edge device, wherein the utility function is a measure of utility of the device as a function of DFWF. The one or more computer processors responsive to identifying convergence, determine the converged values of DFWF to be optimal values of DFWF for the plurality of edge devices.

DETAILED DESCRIPTION

Figure 1:
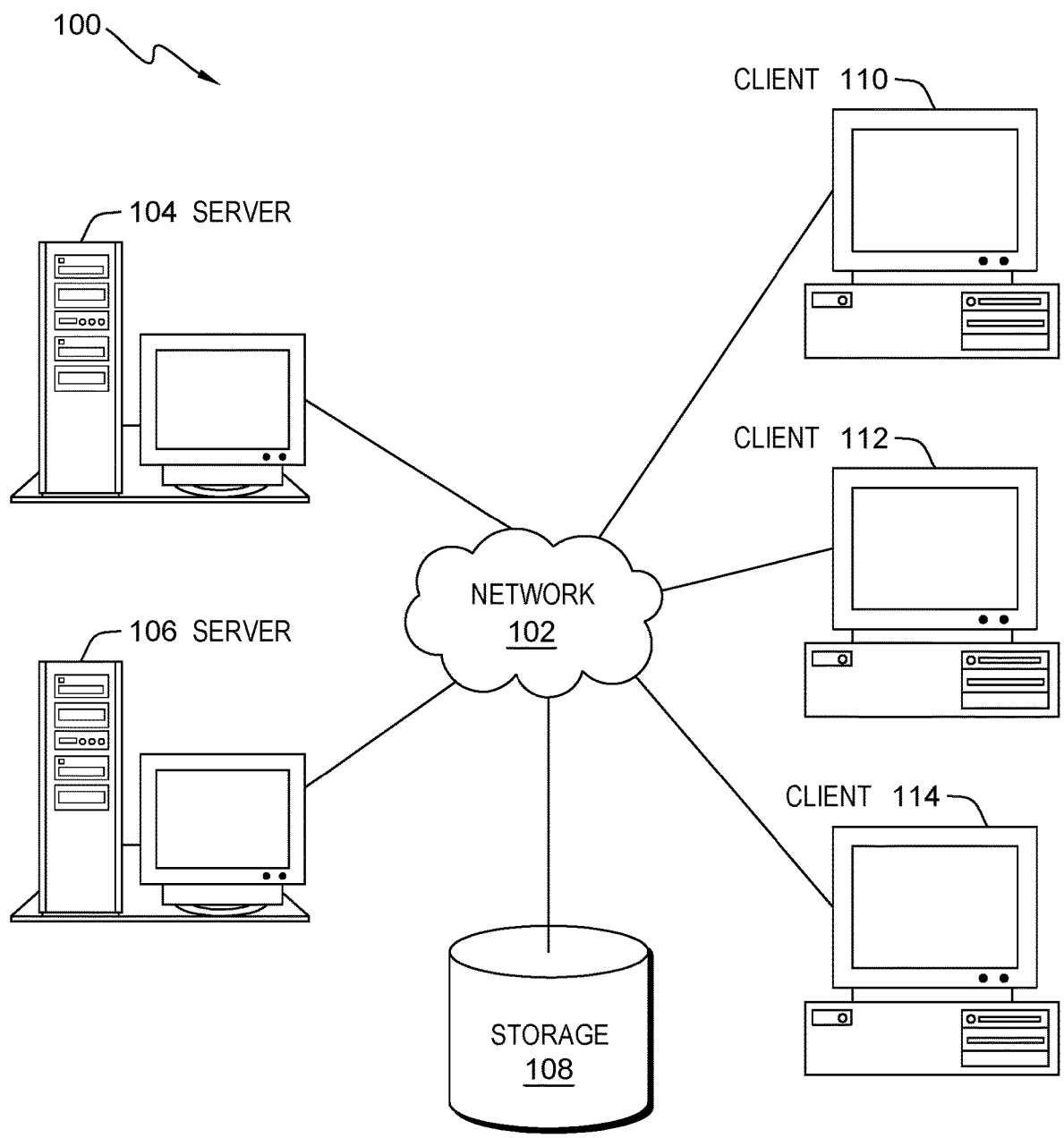
FIG. 1 depicts a pictorial representation of an example distributed system, in accordance with an embodiment of the present invention.

The present invention relates generally to the field of distributed networks, and in particular to a method for managing transmission frequency for a plurality of edge devices of an interconnected distributed network. The present invention also relates to a computer program product comprising computer-readable program code that enables a processor of a system or a number of processors of a network, to implement such a method. The present invention also relates to a system for managing transmission frequency for a plurality of edge devices of an interconnected distributed network. The present invention seeks to provide a method for managing transmission frequency for a plurality of edge devices of an interconnected distributed network. Such a method may be computer-implemented.

The present invention further seeks to provide a computer program product including computer program code for implementing a proposed method when executed by a processing unit. The present invention also seeks to provide a processing system adapted to execute this computer program code. The present invention also seeks to provide a system for managing transmission frequency for a plurality of edge devices of an interconnected distributed network. According to an aspect of the invention, there is provided a computer-implemented method for managing transmission frequency for a plurality of edge devices of an interconnected distributed network. The method comprises determining a maximum writing frequency, MWF, for the distributed network. The method also comprises iteratively processing values of data flow writing frequency, DFWF, for the edge devices in accordance with an optimization algorithm based on the MWF to identify convergence in the values of DFWF. Each iteration of processing values comprises, at each edge device, determining a value of DFWF based on an associated utility function of the edge device, the utility function defining a measure of utility of the device as a function of DFWF. Responsive to identifying convergence, the method determines the converged values of DFWF to be optimal values of DFWF for the edge devices.

Proposed are concepts for transmission frequency management for edge devices of a decentralized architecture (i.e. interconnected distributed network). In such concepts, the MWF may be optimized with respect to a plurality (e.g.

group) of IoT devices. For such optimization, each edge device may have an associated utility function. The utility function may represent how much a user can practically benefit from the device for a given DFWF. Put another way, a device's associated utility function may define a measure of utility of the device as a function of DFWF. By way of example, in a machine learning application, a utility function may model the accuracy of a trained model with respect to DFWF of the device.

Embodiments of the present invention may seek to maximize the overall utility of a plurality of edge devices given an MWF of the distributed network the edge devices are connected to. In particular, proposed embodiments may employ a decentralized optimization algorithm across a gateway device and a plurality of edge devices such that privacy of the edge device is preserved. For instance, utility functions may be locally defined at each edge device and not revealed to any other third-party devices or management platform, including the gateway device implementing part of an optimization algorithm employed by an embodiment.

Embodiments of the present invention are directed to a concept of employing a decentralized optimization algorithm that preserves privacy of utility functions associated with the plurality of edge devices. In this way, embodiments may provide for optimized management of transmission frequency whilst maintaining privacy of sensitive/confidential utility information relating to the edge device of a distributed network. In particular, it is proposed to leverage a decentralized privacy-aware algorithm on an existing distributed communication architecture (e.g. IoT architecture).

In embodiments of the prevent invention, a workload scheduling problem may be modelled as a constrained concave/convex optimization problem. Instead of looking at the workload privacy, a primary focus of proposed embodiments may be to protect the sensitive information (e.g. utility function) of a user-defined edge device (e.g. IoT), which may, for example, capture/describe the importance of a particular device in the distributed network. By way of example, in some embodiments, a transmission frequency may be optimally calculated not only depending on the external system resources but also accounting for user customizable preference(s).

Some embodiments of the present invention employ a cooperative decentralized algorithm to optimally calculate the transmission frequency of edge devices in a plug-and-play and privacy-aware manner. As a result of taking such a decentralized approach, a node of an upper-level with respect to the edge devices, e.g. a gateway, may only need to collect limited information of the edge device(s) for computing purposes, thus not requiring full access to utility functions of the edge device(s). Although, in some embodiments, an associated utility function of a device may have been previously generated or defined (e.g. based on a user input and/or control signal), other embodiments may be configured to generate such utility function (e.g. based on user input signals). Thus, some embodiments may further comprise, at each edge device, determining a utility function for the device and associating the determined utility function with the device. In this way, improved flexibility may be provided. Also, dynamic updating or recalculation of utility functions may be facilitated.

Iterative processing may be undertaken, in part, at a non-edge device of the interconnected distributed network. For instance, a gateway may undertake part of the optimization processing. In this way, a decentralized optimization approach may be employed which prevents utility functions local to the edge devices being revealed or exposed. Embodiments may thus involve a gateway as part of the iterative process. Put another way, a gateway may undertake part of the optimization processing and the non-edge device(s) may undertake part of the optimization processing as to implement a decentralized/distributed optimization processing arrangement.

A first edge device of the plurality of edge devices may have an associated utility function that comprises a continuously differentiable, non-decreasing concave function. For example, an associated utility function of the first edge device may be modelled as a cluster of weighted logarithm functions. Other convex/concave functions can also be used for the utility function. Also, the logarithm function, say $y=\log(x)$ is continuously differentiable, and non-decreasing concave function. However, according to proposed embodiments a utility function need not be continuously non-decreasing. For example, a concave function may be non-decreasing in an interval and decreasing in the other interval. Thus, according to embodiments a utility function associated with a first edge device may be continuously differentiable and have a first order derivative that is decreasing. The optimization algorithm may comprise an Alternating Direction Method of Multipliers, ADMM, algorithm. This is just one example of a decentralized algorithm that may be employed. Other different decentralized algorithms may be used, including, the well-known dual decomposition method. Proposed embodiments may therefore leverage well-known and established decentralized algorithms, thereby reducing the cost and/or complexity of implementing proposed embodiments.

Some embodiments may further comprise communicating the optimal values of DFWF to their respective edge devices. In this way, an optimal DFWF value may be set for each edge device, and then edge devices can start pushing data to the distributed network. Here, it is also noted that the data passed through the distributed network may be stored in an off-premise database (e.g. in the cloud) for further data analysis and/or visualization. This embodiment may further comprise: responsive to an operational parameter of interconnected distributed network changing: iteratively processing values of DFWF for the edge devices in accordance with an optimization algorithm based on the MWF to identify a new convergence in the values of DFWF; and responsive to identifying a new convergence, determining the new converged values of DFWF to be new optimal values of DFWF for the edge devices.

When compared to conventional approaches, proposed embodiments may provide one or more of the following advantages: (i) the utility functions may be customizable in any practical scenario (with some concavity assumptions); (ii) no direct control of the sampling rate of the edge devices, which is usually complicated, instead, embodiments may calculate the optimal writing frequency of each device subject to a MWF constraint; (iii) decentralized architecture has high scalability for various device access; (iv) the optimal solution may be calculated without revealing information on utility functions; (v) the optimal solution may be recalculated adaptively when external contexture changes, e.g. MWF, number of edge devices changes (as a result of an edge device being disconnected/connected), etc.; and (vi) proposed embodiments may be used to prevent a critical edge device being exposed to an external malicious attacker, especially in a safety-related application, e.g. financial system.

According to another aspect of the invention, there is a computer program product. The computer program product comprises a computer readable storage medium having program instructions embodied therewith, the program instructions executable by a processing unit to cause the processing unit to perform a method according to a proposed embodiment. According to another aspect of the invention, there is provided a computer system comprising at least one processor and the computer program product according to an embodiment. At least one processor is adapted to execute the computer program code of said computer program product. According to yet another aspect of the invention, there is provided a system for managing transmission frequency for a plurality of edge devices of an interconnected distributed network. The system comprises a processing component configured to determine a maximum writing frequency, MWF, for the distributed network. The system also comprises a plurality of edge devices. Each edge device is configured to determine a value of data flow writing frequency, DFWF, based on the edge device's associated utility function, the utility function defining a measure of utility of the device as a function of DFWF. The system also comprises an optimization component configured to iteratively process values of DFWF for the edge devices in accordance with an optimization algorithm based on the MWF to identify convergence in the values of DFWF and, responsive to identifying convergence, to determine the converged values of DFWF to be optimal values of DFWF for the edge devices.

In the context of the present application, where embodiments of the present invention constitute a method, it should be understood that such a method may be a process for execution by a computer, i.e. may be a computer-implementable method. The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention. Further, an edge device may be an Internet-of-Things (IoT) device that is configured to be communicatively coupled to the edge of an interconnected distributed network.

Proposed are concepts for transmission frequency management for edge devices of a decentralized architecture (i.e. interconnected distributed network). In such concepts, the MWF may be optimized with respect to a plurality (e.g. group) of IoT devices. Such optimization may employ a decentralized optimization algorithm across a non-edge device and a plurality of edge devices so that privacy of the edge device(s) is preserved. For instance, utility functions may be locally defined at each edge device and not revealed to any other third-party devices or management platform, including the non-edge device implementing part of the optimization algorithm.

There is proposed a concept of employing a decentralized optimization algorithm that preserves privacy of utility functions associated with the plurality of edge devices. As a result of taking such a decentralized approach, a node of an upper-level with respect to the edge devices (e.g. a gateway) may only need to collect limited information of the edge device(s) for computing purposes, thus not requiring full access to utility functions of the edge device(s). In this way, embodiments may provide for optimized management of transmission frequency whilst maintaining privacy of sensitive/confidential utility information relating to the edge device of a distributed network. In particular, embodiments may leverage a decentralized privacy-aware algorithm on an existing distributed communication architecture (e.g. IoT architecture).

Implementation of embodiments of the invention may take a variety of forms, and exemplary implementation details are discussed subsequently with reference to the Figures. It should be understood that the Figures are merely schematic and are not drawn to scale. It should also be understood that the same reference numerals are used throughout the Figures to indicate the same or similar parts.

The present invention will now be described in detail with reference to the Figures.

FIG. 1 depicts a pictorial representation of an exemplary distributed system in which aspects of the illustrative embodiments may be implemented. A distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, first server 104 and second 106 servers are connected to the network 102 along with a storage unit 108. In addition, clients 110, 112, and 114 are also connected to the network 102. Clients 110, 112, and 114 may be edge devices, for example, personal computers, network computers, IoT devices, or the like. In the depicted example, the first server 104 provides data, such as boot files, operating system images, and applications to clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Figure 2:
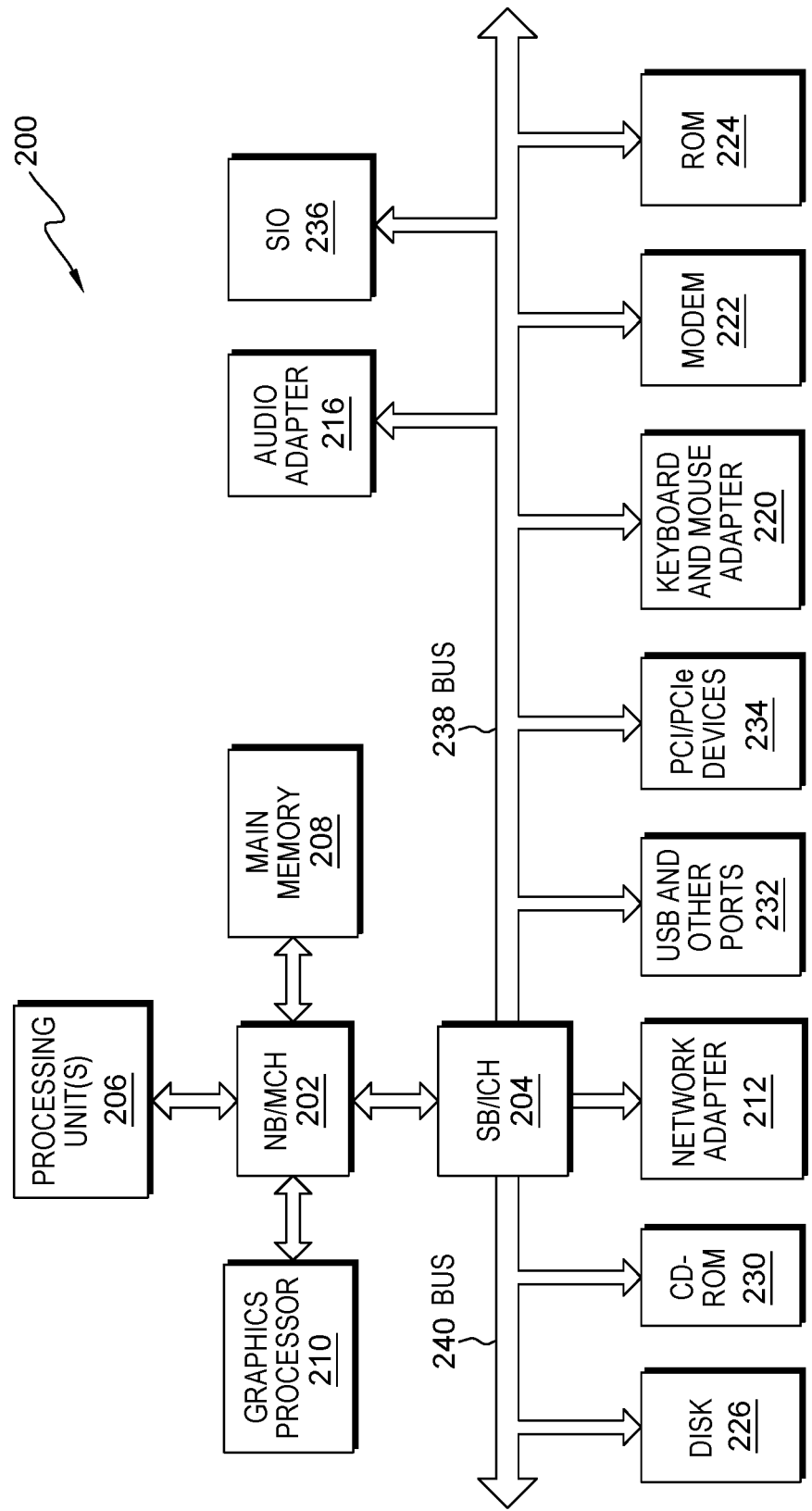
FIG. 2 is a block diagram of an example system, in accordance with an embodiment of the present invention.

FIG. 2 depicts a block diagram of an example system 200 in which aspects of the illustrative embodiments may be implemented. The system 200 is an example of a computer, such as client 110 in FIG. 1, in which computer usable code or instructions implementing the processes for illustrative embodiments of the present invention may be located. For instance, a proposed embodiment may be partly implemented in a processing unit 206 of the system 200.

In the depicted example, the system 200 employs a hub architecture including a north bridge and memory controller hub (NB/MCH) 202 and a south bridge and input/output (I/O) controller hub (SB/ICH) 204. Thus, another proposed embodiment may be implemented in the memory controller hub 202 of the system 200. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) port and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system may run in conjunction with the operating system and provides calls to the operating system from a plurality of programs or applications executing on system 200.

As a server, system 200 may be, for example, a computer system, running an open source operating system. The system 200 may be a symmetric multiprocessor (SMP) system including a plurality of processors in processing unit 206.

Alternatively, a single processor system may be employed. Instructions for the operating system, the programming system, and applications or programs are located on storage devices, such as HDD 226, and may be loaded into main memory 208 for execution by processing unit 206. Similarly, one or more programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. In an embodiment, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

As detailed above, proposed embodiments provide a method and system for privacy-aware transmission frequency management for optimizing edge devices of a distributed communication network. By way of further explanation, a proposed embodiment will now be described with IoT edge devices.

Figure 3A:
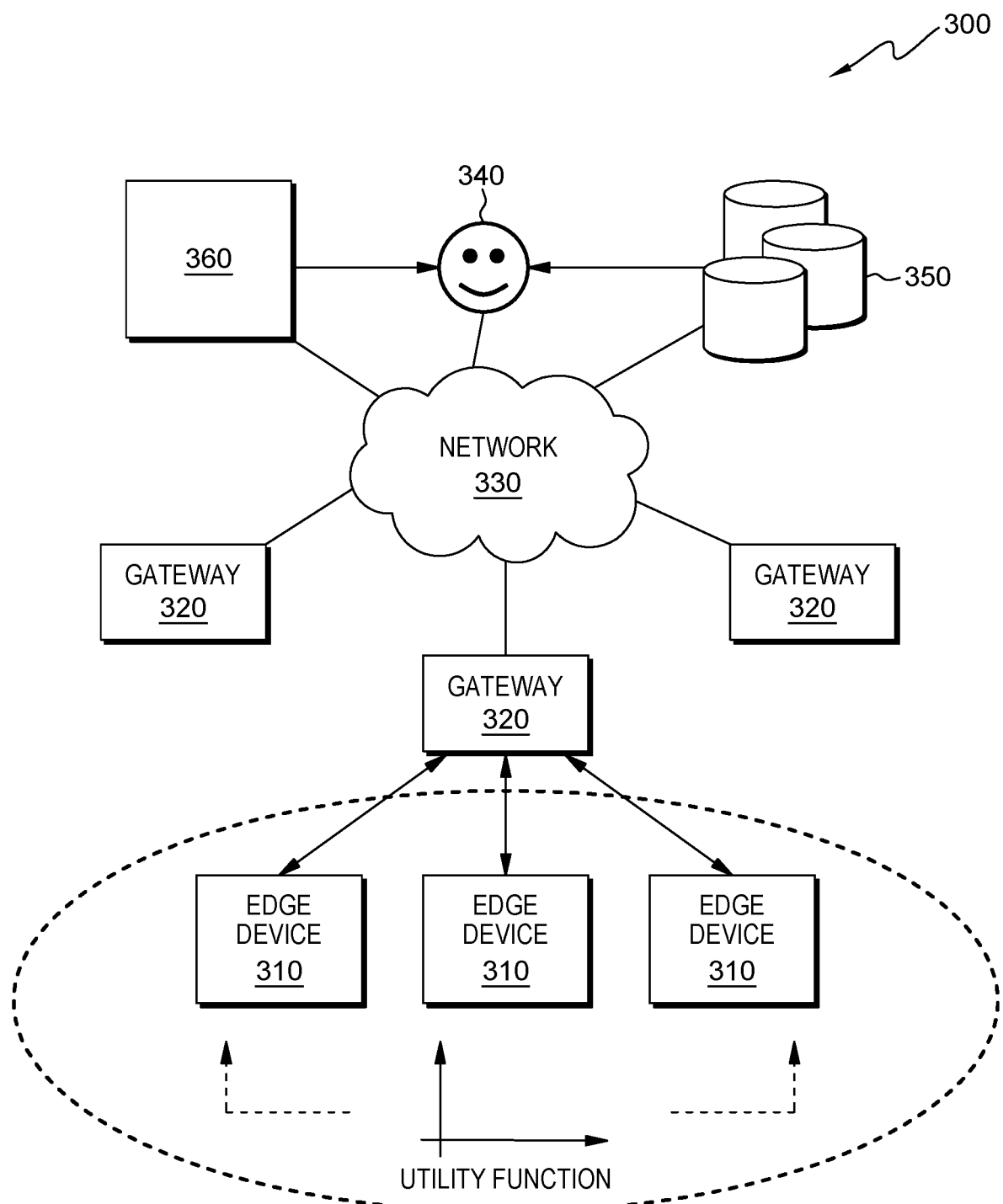
FIG. 3A is a schematic diagram of proposed distributed communication system, in accordance with an embodiment of the present invention.

FIG. 3A depicts a schematic diagram of proposed distributed communication system according to an embodiment. The system 300 comprises four main components: IoT devices 310; gateways 320, a cloud network platform 330; and users 340. The exemplary system also comprises a data storage system 350, which is accessible via the cloud network platform 330 and also directly accessible by the users 340. Also included in the system 300 is a data visualization component for facilitating data analysis.

The main functionalities of each of the four main components are summarized as follows: IoT devices 310: edge devices, such as sensors or devices, to be connected to a gateway 320, having capabilities of defining utility functions for solving an optimization problem of interest in a decentralized manner. Gateways 320: collecting data from IoT devices/sensors, passing data to the cloud network platform 330, and conducting basic data processing tasks. Cloud network platform 330: a central hub for data analysis, monitoring and storage. Users 340: the owner of the IoT devices 310 who wishes to facilitate the devices in an area for some application purposes.

Considering an example with N number of IoT devices 310 connected a gateway 320, a utility function associated with an $i^{th}$ device may be represented as $f_i(x_i)$. Then, with a maximum writing frequency, MWF per time slot, a user U may wish to determine the optimal data flow writing frequency (DFWF) of transmission rate for every IoT device 310 so that the overall utility of the whole group of IoT devices 310 can be maximized. Mathematically, this optimization problem can be represented using the following equations (Equation 1 and 2) where $x_i \geq 0$:

$$\max\nolimits_{x_1, x_2, \ldots, x_N} \Sigma_{i=1}^{N} f_i(x_i) \qquad (1)$$

$$s.t. \Sigma_{i=1}^{N} x_i \leq c \qquad (2)$$

With respect to equations (1) and (2), $x_i$ denotes the DFWF of the $i^{th}$ device at every time slot, e.g. 1 second, and c denotes the MWF for all devices. As has been mentioned above, c could be set to 10 for basic/standard user, and 50 for an advanced/power user. Finally, $f_i(x_i)$ denotes the utility of the $i^{th}$ device given $x_i$, and, in practice, this implies how a user could benefit from the DFWF $x_i$ of device i.

In this example, we assume that each utility function $f_i$ can be modelled as a continuously differentiable, non-decreasing, strictly concave function. This is a common assumption seen in modelling internet traffic behaviour. As an example, a utility function $f_i$ may be modelled as a cluster of weighted logarithmic functions, which represent a proportional fairness pattern of the optimal resource allocation with respect to a user U. To solve the above optimization problem, it is proposed to deploy a decentralized algorithm on each IoT edge device 310 iteratively so that the optimal DFWF can be decided when the algorithm converges. A schematic diagram for algorithm iteration is shown in FIG. 3B.

Figure 3B:
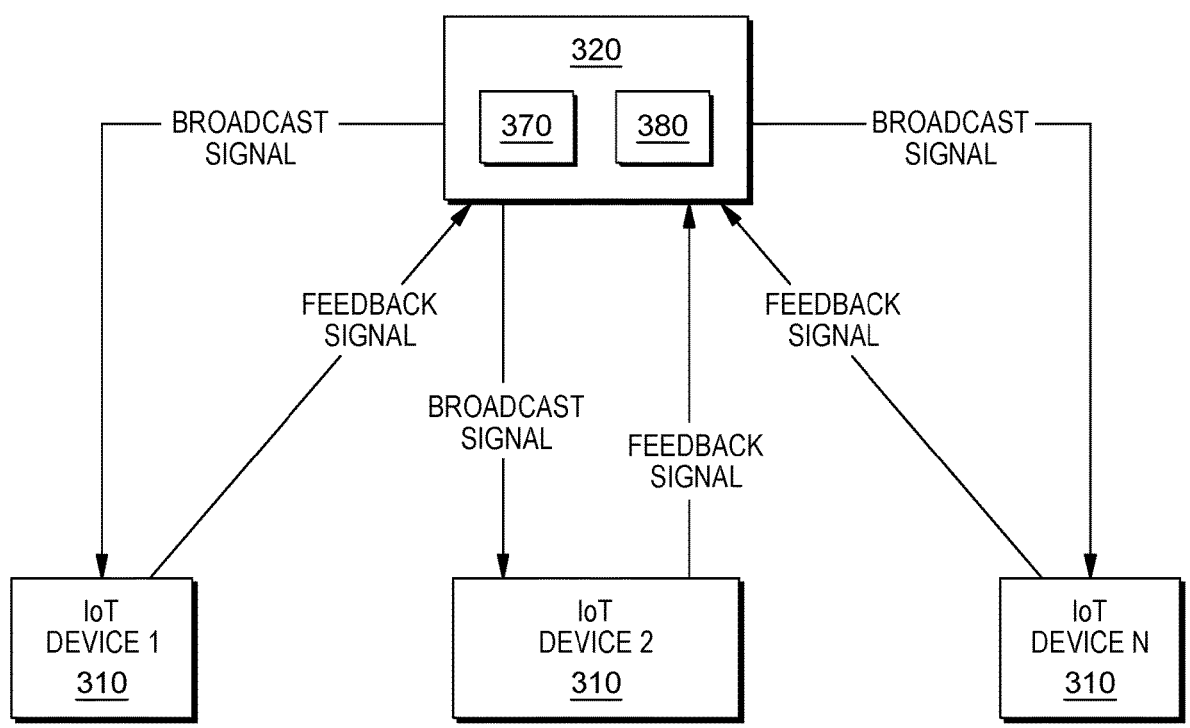
FIG. 3B is a schematic diagram depicting an algorithm iteration, in accordance with an embodiment of the present invention.

In FIG. 3B, each IoT device 310 can be interpreted as either a physical entity, e.g. a raspberry pi device, or a "virtual device", i.e. any other type of sensors or devices to be available for interaction with the system. Also, the gateway 320 comprises: a processing component 370 configured to determine a MWF, for the distributed network; and an optimization component 380 configured to iteratively process values of DFWF for the edge devices in accordance with an optimization algorithm based on the MWF to identify convergence in the values of DFWF.

To solve the optimization problem, for completeness, the steps for an exemplary implementation of the algorithm may be represented as follows:

$$\text{Initialization: } k=0, x_i(k)=0, y(k)=y_0, \alpha(k)=\alpha_0 \qquad (3)$$

While $|\Sigma_{i=1}^{N} x_i(k) - c| \geq \sigma$ do:
Gateway broadcasts y(k) to the Network of IoT Devices
For each IoT Device do:
Get y(k) from the Gateway
Updating $x_i$:

$$x_i(k+1) = \text{argmax}_{x_i(k)} [\Sigma_{i=1}^{N} f_i(x_i(k)) + y(k) x_i(k) - 1/N y(k) c]$$

Sending $x_i(k+1)$ to the Gateway
Gateway gathers $x_i(k+1)$
Gateway updates y: $y(k+1) = y(k) + \alpha(k)[\Sigma_{i=1}^{N} x_i(k) - c]$
Updating k: $k=k+1$ With respect to algorithm (3), σ denotes the threshold value (e.g. a small real number) for algorithm convergence, c is a constant that defines the total amount of resources (MWF) to be distributed for all IoT devices, $x_i(k)$ denotes the state of $x_i$ at the $k^{th}$ iteration, it is thus expected that $x_i$ converges to an optimum when the algorithm converges, i.e. when $|\Sigma_{i=1}^{N} x_i(k) - c| < \sigma$, and y is the parameter which depends on the amount of remaining resource $(\Sigma_{i=1}^{N} x_i(k) - c)$ as well as the step size $\alpha(k)$. A benefit of deploying such a decentralized algorithm is that each IoT device locally resolves a simple sub-optimization problem in an iterative manner, which eventually converges to the optimality for the whole group. This may all be done without sharing its associated utility function to a central agent (e.g. gateway), thus preserving privacy.

Figure 4:
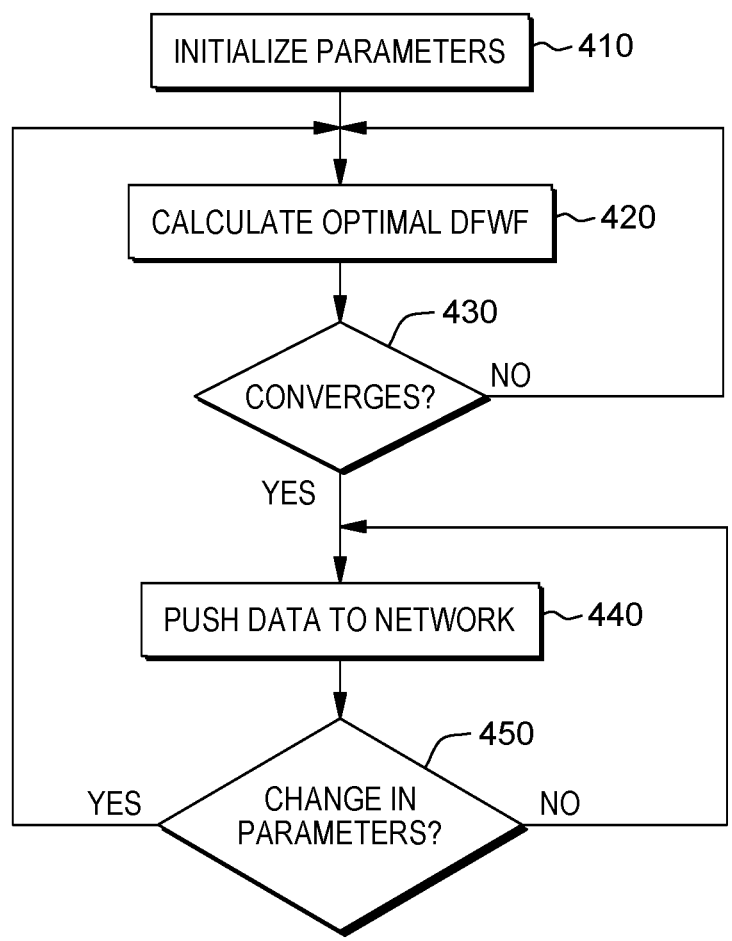
FIG. 4 is a simplified flow diagram of a method, in accordance with an embodiment of the present invention.

FIG. 4 depicts a simplified flow diagram, of an exemplary embodiment.

Step 410—Initialization: During the initialization stage, a user specifies some parameters before running the algorithm. This, for example, includes the number of IoT devices, the available MWF, and the utility function associated with each device.

Step 420—Calculate Optimal DFWF: After initialization is complete, the ADMM algorithm is implemented to find an optimal DFWF for each device.

Step 430—Check for Convergence: The algorithm is implemented in an iterative manner to check if it is converged to optimality. If no convergence is identified, the method returns to step 420. If convergence is identified, the method proceeds to step 430.

Step 440—Push Data to Network: When the algorithm converges, the optimal DFWF will be set to each device, and then devices can start pushing data to the cloud. Note that the data passed through the cloud can be eventually stored in a cloud database for further data analysis and visualization.

Step 450—Check for Parameter Changes: If there's any parameter changed during runtime, the system will stop pushing data to the cloud and the algorithm will dynamically capture the changes in order to return to step 420 and recalculate the optimal solution given the new set of parameters.

Figure 5:
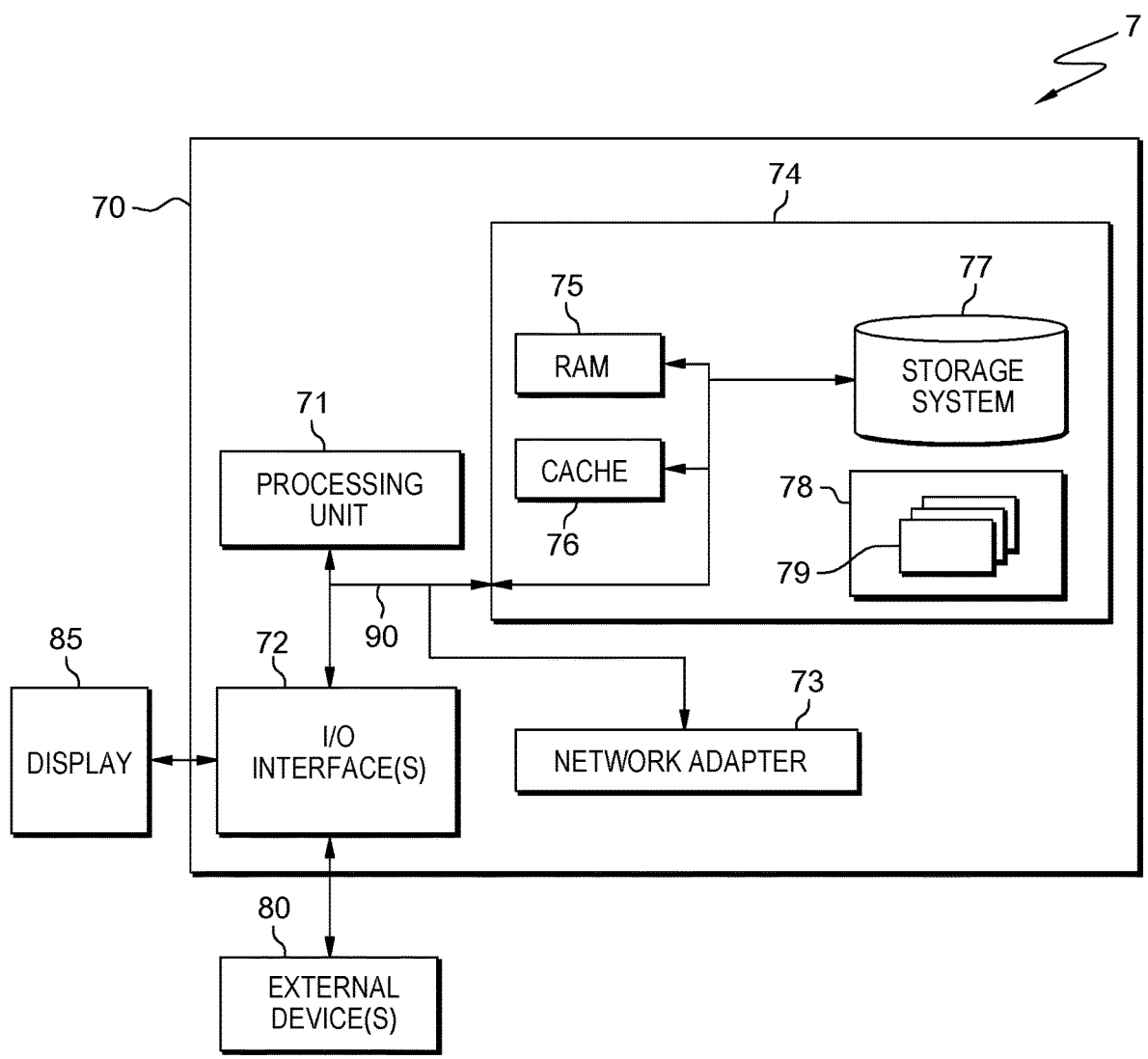
FIG. 5 illustrates a system, in accordance with an embodiment of the present invention.

FIG. 5 depicts a block diagram of components of computer system 70, which may form part of a networked system 7, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

In an instance, a processing component configured to determine an MWF for a distributed network according to an embodiment may be implemented in the computer system 70 (e.g. as a processing unit 71). The components of computer system/server 70 may include, but are not limited to, one or more processing arrangements, for example comprising processors or processing units 71, a system memory 74, and a bus 90 that couples various system components including system memory 74 to processing unit 71. System memory 74 can include computer system readable media in the form of volatile memory, such as random-access memory (RAM) 75 and/or cache memory 76. Computer system/server 70 may further include other removable/non-removable, volatile/non-volatile computer system storage media. In such instances, each can be connected to bus 90 by one or more data media interfaces. The memory 74 may include at least one program product having a set (e.g., at least one) of program modules that are configured to carry out the functions of proposed embodiments. For instance, the memory 74 may include a computer program product having program executable by the processing unit 71 to cause the Input/Output (I/O) interface 72 perform a method for according to a proposed embodiment. Program/utility 78, having a set (at least one) of program modules 79, may be stored in memory 74. Program modules 79 generally carry out the functions and/or methodologies of proposed embodiments for partial write operations to memory.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73 (e.g. to communicate determined optimal values of DFWF to edge devices of a distributed network).

In the context of the present application, where embodiments of the present invention constitute a method, it should be understood that such a method is a process for execution by a computer, i.e. is a computer-implementable method. The steps of the method therefore reflect various parts of a computer program, e.g. parts of one or more algorithms.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q #, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    determining, by one or more computer processors, a maximum writing frequency, MWF, for an interconnected distributed network;
    iteratively processing, by one or more computer processors, values of data flow writing frequency, DFWF, for a plurality of edge devices of the interconnected distributed network, the method in accordance with an optimization algorithm based on the MWF to identify convergence in the values of DFWF, wherein each iteration of processing values comprises, at each edge device in the plurality of edge devices, determining a value of DFWF based on an associated utility function of the respective edge device, wherein the utility function is a measure of utility of the device as a function of DFWF; and
    responsive to identifying a convergence, determining, by one or more computer processors, the converged values of DFWF to be optimal values of DFWF for the plurality of edge devices.

2. The method of claim 1, further comprising:
    at each edge device in the plurality of edge devices, determining, by one or more computer processors, a utility function for the device and associating the determined utility function with a respective edge device.

3. The method of claim 1, wherein the step of iteratively processing is undertaken, in part, at a non-edge device of the interconnected distributed network and, in part, at each edge devices in the plurality of edge devices of the interconnected distributed network.

4. The method of claim 1, wherein a first edge device in the plurality of edge devices has an associated utility function that comprises a continuously differentiable, non-decreasing concave function.

5. The method of claim 4, wherein the associated utility function of the first edge device is modelled as a cluster of weighted logarithm functions.

6. The method of claim 1, wherein the optimization algorithm comprises an Alternating Direction Method of Multipliers, ADMM, algorithm.

7. The method of claim 1, further comprising:
    communicating, by one or more computer processors, the optimal values of DFWF to respective edge devices.

8. The method of claim 1, further comprising:
    responsive to an operational parameter of interconnected distributed network changing: iteratively processing, by one or more computer processors, values of DFWF for the plurality of edge devices in accordance with an optimization algorithm based on the MWF to identify a new convergence in the values of DFWF; and responsive to identifying a new convergence, determining the new converged values of DFWF to be new optimal values of DFWF for the plurality of edge devices.

9. A computer program product comprising:
    one or more computer readable storage media and program instructions stored on the one or more computer readable storage media, the stored program instructions comprising:
    program instructions to determine a maximum writing frequency (MWF) for the distributed network;
    program instructions to iteratively process values of data flow writing frequency (DFWF) for a plurality of edge devices of an interconnected distributed network in accordance with an optimization algorithm based on the MWF to identify convergence in the values of DFWF, wherein each iteration of processing values comprises, at each edge device, determining a value of DFWF based on the edge device's associated utility function, the utility function defining a measure of utility of the device as a function of DFWF; and
    program instructions to, responsive to identifying a convergence, determine the converged values of DFWF to be optimal values of DFWF for the edge devices.

10. A system comprising:
    a processing component configured to determine a maximum writing frequency, MWF, for the distributed network;
    a plurality of edge devices of an interconnected distributed network, wherein each edge device in the plurality of edge devices is configured to determine a value of data flow writing frequency, DFWF, based on the associated utility function of the respective edge device, the utility function defining a measure of utility of the device as a function of DFWF; and
    an optimization arrangement configured to iteratively process values of DFWF for the plurality of edge devices in accordance with an optimization algorithm based on the MWF to identify convergence in the values of DFWF and, responsive to identifying a convergence, to determine the converged values of DFWF to be optimal values of DFWF for the edge devices.

11. The system of claim 10, wherein each edge device is configured to determine a utility function for the device and to associate the determined utility function with the device.

12. The system of claim 10, wherein the optimization arrangement comprises a non-edge device of the interconnected distributed network and the edge devices of the interconnected distributed network.

13. The system of claim 10, wherein a first edge device of the plurality of edge devices has an associated utility function that comprises a continuously differentiable, non-decreasing concave function.

14. The system of claim 13, wherein the first edge device's associated utility function is modelled as a cluster of weighted logarithm functions.

15. The system of claim 10, wherein the optimization algorithm comprises an Alternating Direction Method of Multipliers, ADMM, algorithm.

16. The system of claim 10, wherein the optimization arrangement is further configured to:
    responsive to an operational parameter of interconnected distributed network changing: iteratively process values of DFWF for the plurality of edge devices in accordance with an optimization algorithm based on the MWF to identify a new convergence in the values of DFWF; and responsive to identifying a new convergence, determine the new converged values of DFWF to be new optimal values of DFWF for the plurality of edge devices.

\* \* \* \* \*